United States Patent
Moturu (10) Patent No.: US 9,189,355 B1
(45) Date of Patent: Nov. 17, 2015

(54) METHOD AND SYSTEM FOR PROCESSING A SERVICE REQUEST

(71) Applicant: Tapasvi Moturu, Sunnyvale, CA (US)

(72) Inventor: Tapasvi Moturu, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 199 days.

(21) Appl. No.: 13/899,471

(22) Filed: May 21, 2013

(51) Int. Cl.
*G06F 11/00* (2006.01)
*G06F 11/30* (2006.01)
*H04L 12/26* (2006.01)

(52) U.S. Cl.
CPC ........... *G06F 11/301* (2013.01); *H04L 43/0823* (2013.01)

(58) Field of Classification Search
CPC ............ G06F 11/3006; G06F 11/3065; G06F 11/3086; G06F 17/30144; G06F 11/301; H04L 43/0823
See application file for complete search history.

(56) References Cited

U.S. PATENT DOCUMENTS

| | | | |
|---|---|---|---|
| 7,606,814 B2 * | 10/2009 | Deily et al. ........................... 1/1 |
| 8,171,133 B2 * | 5/2012 | Tanaka ......................... 709/224 |
| 2010/0228650 A1 * | 9/2010 | Shacham et al. ................ 705/34 |
| 2013/0007265 A1 * | 1/2013 | Benedetti et al. ............. 709/224 |
| 2013/0018765 A1 * | 1/2013 | Fork et al. ........................ 705/34 |
| 2013/0091284 A1 * | 4/2013 | Rothschild ..................... 709/226 |
| 2013/0290441 A1 * | 10/2013 | Linden Levy ................. 709/206 |
| 2014/0019478 A1 * | 1/2014 | Wu et al. ........................ 707/770 |

OTHER PUBLICATIONS

Mi, Haibo; Wang, Huaimin; and Yin, Gang; "Performance Problems Online Detection in Cloud Computing Systems via Analyzing Request Execution Paths;" Dependable Systems and Networks Workshops (DSN-W), 2011 IEEE/IFIP 41st International Conference on Jun. 27-30, 2011; pp. 135-139.*

* cited by examiner

*Primary Examiner* — Joseph Kudirka
(74) *Attorney, Agent, or Firm* — Osha Liang LLP (57) ABSTRACT

A method for processing a service request, including receiving, from a client application, the service request which includes a header which includes transmission metadata and a client trace ID. An internal trace ID is appended to the service request and a request trace log including the client trace ID, the internal trace ID, and a time stamp corresponding to receiving the service request is generated. The method further includes selecting a cloud server including functionality to process the service request. The cloud server determines a dedicated computing cluster of a plurality of distributed cloud computing clusters to handle the service request and sends the service request to the dedicated computing cluster. Finally, the method includes recording, in the request trace log, an interaction of the dedicated computing cluster with the service request.

15 Claims, 4 Drawing Sheets

METHOD AND SYSTEM FOR PROCESSING A SERVICE REQUEST

BACKGROUND

Cloud computing is increasingly common in modern software design. Software as a service is an implementation where a business client uses the functionality of software being executed by a service provider in the cloud. Specifically, the business client may issue a request to the software in the cloud. In response, the software executes tasks for the request and provides a result to the business client.

SUMMARY

In general, in one aspect, the invention relates to a method for processing a service request. The method includes receiving, from a client application, the service request including a header including transmission metadata and a client trace ID, appending, to the service request, an internal trace ID, generating a request trace log including the client trace ID, the internal trace ID, and a time stamp corresponding to receiving the service request and selecting a cloud server including functionality to process the service request. The cloud server determines a dedicated computing cluster of a plurality of distributed cloud computing clusters to handle the service request, and sends the service request to the dedicated computing cluster. Finally, an interaction of the dedicated computing cluster with the service request is recorded in the request trace log.

In general, in one aspect, the invention relates to a system for processing a service request. The system includes a processor and a cloud server cluster including functionality to receive, from a client application, the service request including a header including transmission metadata and a client trace ID, and to select a cloud server of the cloud server cluster to process the service request. The cloud server determines a dedicated computing cluster of a plurality of distributed cloud computing clusters to handle the service request, and sends the service request to the dedicated computing cluster. The system further includes a monitoring application including functionality to append, to the service request, an internal trace ID, to generate a request trace log including the client trace ID, the internal trace ID, and a time stamp corresponding to receiving the service request, and to record, in the request trace log, components of the distributed computing resources which interact with the service request.

In general, in one aspect, the invention relates to a non-transitory computer readable medium including computer executable instructions. The computer executable instructions include functionality for receiving, from a client application, the service request including a header comprising transmission metadata and a client trace ID, appending, to the service request, an internal trace ID, generating a request trace log, including the client trace ID, the internal trace ID, and a time stamp corresponding to receiving the service request, and selecting a cloud server including functionality to process the service request. The computer executable instructions include functionality for determining, by the cloud server, a dedicated computing cluster of a plurality of distributed cloud computing clusters to handle the service request, sending, by the cloud server, the service request to the dedicated computing cluster, and recording, in the request trace log, an interaction of the dedicated computing cluster with the service request.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for appending a client trace identifier (ID) to a header of a service request being sent to a software services cloud. Once the service request is received by the software services cloud, an internal trace ID for the software services cloud is assigned to service request, and, correspondingly, the client trace ID generated by the client application. Relating the client trace ID and internal trace ID allows the internal debugging of the software services cloud and the external debugging of the client applications interactions with the software services cloud to share a common reference point. Further, the client trace ID associated with a service request issued by the client application may traverse multiple levels of abstraction and processing of the service request, which may be out of the control of the client application, before interacting with the software services cloud.

Figure 1:
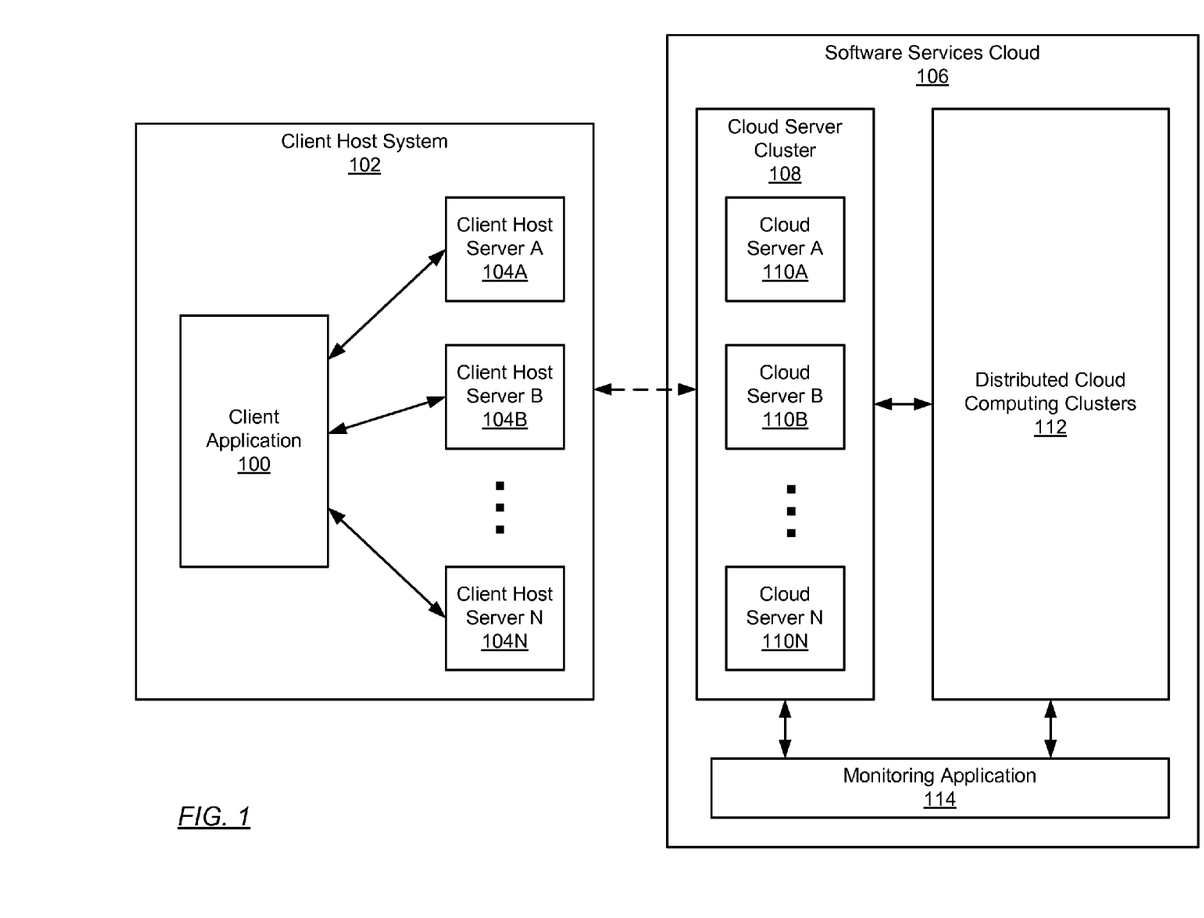
FIG. 1 shows a schematic diagram of a system in accordance with one or more embodiments of the invention.

FIG. 1 shows a schematic diagram of a system in accordance with one or more embodiments of the invention. As shown in FIG. 1, a client application (100) executes on a client host system (102), which is connected (e.g., via a network (not shown)) to a software services cloud (106) in accordance with one or more embodiments of the invention. The client host system (102) includes multiple client host servers (e.g., client host server A (104A), client host server B (104B), client host server N (104N)). The software services cloud (106) includes a cloud server cluster (108). The cloud server cluster (108) may include multiple cloud servers (110A, 110B, 110N). In one or more embodiments of the invention, in addition to the cloud server cluster (108), the software services cloud (106) may include distributed cloud computing clusters (112). In one or more embodiments of the invention, the cloud server cluster (108) and the distributing cloud computing clusters (112) may be monitored by one or more instances of a monitoring application (114). Each of the components of the system is discussed in more detail below.

In one or more embodiments of the invention, the client host system (102) is a collection of one or more machines (e.g., client host servers (e.g., client host server A (104A), client host server B (104B), client host server N (104N) and other machines (not shown)) that includes functionality to execute the client application (100) (discussed below). In one or more embodiments of the application, the client host system (102) may be a cloud environment. Each machine of the client host system (102) may include one or more processors, memory (e.g. random access memory (RAM)), storage devices (e.g. hard disk drives, solid states drives, flash memory, optical disks, magnetic tape), network adapters, displays, and other input/output devices. The client host system (102) may be directly accessed by a user (e.g. via mouse, keyboard, touchpad, or other physical input device), or may be accessed remotely (e.g. via a virtual terminal, a shared desktop, an internet browser, or other method of remotely accessing a computer system).

In one or more embodiments of the invention, the client host system (102) may be a located on machines located in a third party server cluster or data center allocated to the client application (100) by the third party hosting service or cloud computing provider. The client host system (102) may include a single execution environment which spans multiple physical machines, multiple execution environments located on a single physical machine, or any other combination of hardware and virtualization. The client host system (102) may span multiple physical machines, networks, data centers, geographic locations, execution environments, and third party providers.

By way of an example, the client host system (102) may correspond to data center operated by a financial institution. A financial institution, such as a bank, may have multiple data centers in different geographic locations in order to expediently provide service to regional branches. The however, software executed by one branch may be required to seamlessly access data stored by another branch. Further, as maintenance and updating across the data centers may be inconsistent, the same software may be required to execute seamlessly across different execution environments and hardware.

In one or more embodiments of the invention, the client host system (102) includes multiple client host servers (e.g., client host server A (104A), client host server B (104B), client host server N (104N)). The client host servers may include functionality to connect to, and communicate with other systems via a network (e.g., the Internet). The client host servers may be the only hardware on the client host system (102). Alternatively or additionally, the client host servers may only provide network connectivity, and may connect to other hardware in the client host system (102). In one or more embodiments of the invention, the client host servers may include multiple levels of abstraction. The abstraction may present the client host servers as a single virtual network interface, as a similar number of anonymous virtual servers as the client host servers, or as a greater number of virtual servers than the number of client host servers.

Returning to the client host system (102), the client host system (102) includes functionality to execute the client application (100). Specifically, the client application may execute on one or more machines (e.g., client host servers (e.g., client host server A (104A), client host server B (104B), client host server N (104N)) or other computer system(s) (not shown)). The client application (100) is a software application that performs operations for a client. In one or more embodiments of the invention, the client controls the execution of the client application (100). The client application (100) may be a single distributed application, which executes in parallel across many distinct physical machines. Alternatively or additionally, many distinct instances of the client application (100) may execute on one or more machines of the client host system (102). In one or more embodiments of the invention, the client application (100) may include multiple modules, auxiliary applications, and implementations of specific features which execute remotely from the main application.

In one or more embodiments of the invention, the client application (100) may include a user interface (not shown) and/or an application programming interface (not shown). The user interface may include functionality to receive commands by a user (e.g., an individual who is a part of the client and/or a customer of the client). The client application (100) may also include functionality to execute as a sub-process of, or be controlled by another application. The client application (100) may be a service oriented application, which may be accessed by multiple users simultaneously, such as, for example, a search engine, web application, a database, and/or other application.

In one or more embodiments of the invention, the client application (100) may be financial services software, and include features such as electronic banking, accounting, tax preparation, or other financial management features. The client application (100) may be accessible only to users and applications with access to the client host system (102) or who have permission from the client entity. Alternatively or additionally, the client application (100) or only components of the client application (100) may be accessible to general users. The client application (100) may include a website interface, or may be accessed through a terminal, or using a dedicated application.

In one or more embodiments of the invention, the client application (100) may include functionality to generate a service request (discussed below and in FIG. 2A) to remotely interact with resources and software located in the software services cloud (106) (discussed below). The client application (100) may include functionality to generate and append a client trace ID and a developer key to a header of the service request in order to easily trace interactions with the software services cloud (106). As used in this description and claims, a client application generates and appends a client trace ID and/or the developer key when the client application directly appends client trace ID and/or the developer key or when another application (e.g., an application on the client host system) appends the client trace ID and/or the developer key for the client application.

By way of an example of the client application, consider the scenario in which the client application is a financial institution application. For example, the financial institution application may include functionality to perform a loan financing calculation that requires data about the financial history of many users. The data may be collected by a separate financial software company, which has access to the financial history of many users. The financial software company may offer, as a service, cloud software which can perform manipulations of the data, such as performing background checks of user finances based upon that collected data. Thus, rather than including functionality to obtain the data and perform the background check of the loan financing calculation locally (e.g., on the client host system (102)), the financial institution application may instead include functionality only to issue a service request to the financial software company, and to obtain a result of the background check.

Continuing with FIG. 1, in one or more embodiments of the invention, a software services cloud (106) is a collection of interconnected computer hardware which may be used to perform many simultaneous computing tasks of varying size and complexity. The software services cloud (106) may execute one or more cloud application(s) (not shown) as a service for a client. The cloud applications may include data processing, data storage, webhosting, data mining, advertising, or other types of software. In one or more embodiments of the invention, the cloud application(s) may include functionality to process a service request from a client and return a result to the client. In one or more embodiments of the invention, the software services cloud (106) may include functionality to allow a client to directly control the execution of the cloud application. Alternatively or additionally, the client may only interact with the cloud application using an interface or library managed and maintained by the software services cloud (106).

In one or more embodiments of the invention, the software services cloud (108) includes one or more cloud server clusters (108). A cloud server cluster (108) may be a collection of one or more machines (e.g., cloud servers (e.g., cloud server A (110A), cloud server B (110B), cloud server N (110N), distributed cloud computing clusters (110), and other machines (not shown)) that includes functionality to execute one or more cloud applications (not shown) and a monitoring application (114) (discussed below). In one or more embodiments of the application, the software services cloud (106) is a cloud environment. Each machine of the software services cloud (106) may include one or more processors, memory (e.g. random access memory (RAM)), storage devices (e.g. hard disk drives, solid states drives, flash memory, optical disks, magnetic tape), network adapters, displays, and other input/output devices. The software services cloud (106) may be directly accessed by a user (e.g. via mouse, keyboard, touchpad, or other physical input device), or may be accessed remotely (e.g. via a virtual terminal, a shared desktop, an internet browser, or other method of remotely accessing a computer system).

In one or more embodiments of the invention, the cloud server cluster (108) may include or may serve as an entry point, or provide an interface for interacting with a larger network of distributed cloud computing clusters (112). In one or more embodiments of the invention, the cloud server cluster (108) may be dedicated to receiving and handling service requests.

In one or more embodiments of the invention, the cloud server cluster (108) includes multiple cloud servers (e.g., cloud server A (110A), cloud server B (110B), cloud server N (110N)). In one or more embodiments of the invention, the cluster servers (110A, 110B, 110N) include functionality to send and receive data over a network. A cloud server may be dedicated to receiving and processing any service request. Alternatively, a cloud server (110A, 110B, 110N) may be selected to handle service requests based on, for example, factors such as the availability of the cloud server (110A, 110B, 110N), the identity of the client that issued the service request, the service requested in the service request, and/or other factors.

In one or more embodiments of the invention, the software services cloud (106) includes distributed cloud computing clusters (112). At least a portion of the distributed cloud computing clusters (112) may only be accessible internally to the software services cloud (106). Alternatively or additionally, all of the distributed cloud computing clusters (112) may be accessible externally to the software services cloud. In one or more embodiments of the invention, all of the available resources may be made available as a single monolithic, outward-facing system. In one or more embodiments of the invention, the apparent resources of a single cluster of the distributed cloud computing clusters (112) may be elastic and the portion of the distributed cloud computing clusters (112) allocated to that cluster may be increased or decreased as necessary. For example, a cloud may be composed of many data centers, server clusters, and data repositories forming the distributed cloud computing clusters (112). Portions of the processing, communication and storage capacity of these distributed resources may be allocated to different function specific clusters as demand dictates.

Although not shown in FIG. 1, in one or more embodiments of the invention, the cloud server cluster (108) may be one of distributed cloud computing clusters (112). The distributed cloud computing clusters (112) may include solely clusters identical in form and function to the cloud service cluster (108). Each of the distributed cloud computing clusters (112) may include the same external connectivity as the cloud server cluster (108), but may be associated with a different specific category of software. Each category of software may correspond to the functionality or set of functionalities provided by the software.

For example, a first cluster of the distributed cloud computing clusters (112) may be dedicated to performing risk analysis calculations of investments, and may accordingly have access to resources, which are utilized in said calculations. The investment risk analysis cluster may be externally accessible to a first subset of subscribers to a financial services cloud. A second cluster of the distributed cloud computing clusters (112) may be dedicated to personal finance management, and externally available to a second subset of subscribers, but may be able to access the first to obtain data to use in its calculations. In one or more embodiments of the invention, both of these clusters may also include the functionality of the cloud server cluster (108). In an alternate example, a cloud server cluster (108) may be dedicated to handling and routing all requests directed into the cloud, and may include no processing capacity outside of analyzing service requests and routing them to the appropriate cluster(s) the distributed cloud computing clusters (112).

In one or more embodiments of the invention, the cloud server cluster (108) and the distributed cloud computing clusters (112) are monitored by a monitoring application (114). The monitoring application (114) is a software application that includes functionality to create a request trace log detailing how the handling of a service request by the various constituent parts of the software services cloud (106). Request trace logs are discussed in greater detail in the description of FIG. 2B below. The monitoring application (114) may include functionality to append an internal trace ID to the service request when the service request enters the software services cloud (106). In one or more embodiments of the invention, multiple instances of the monitoring application (114) may execute within the software services cloud (106). The monitoring applications (114) may have dedicated hardware, or all or a portion may execute on the hardware of the resources being monitored. In one or more embodiments of the invention, each distinct cloud server cluster (108) and cluster of the distributed cloud computing clusters (112) may be monitored by a distinct monitoring application (114). In one or more embodiments of the invention, each distinct computer or server within in each server or computing cluster may be monitored by a distinct instance of the monitoring application (114).

The request trace logs may be stored locally to the instance of the monitoring application (114), or in a central data repository (not shown). In one or more embodiments of the invention, the disparate logs may be periodically written to a centralized data repository. In one or more embodiments of the invention, the monitoring application (114) may include functionality to detect errors occurring in the handling of a service request, and to record any error instance IDs associated with the service request.

Figure 2A:
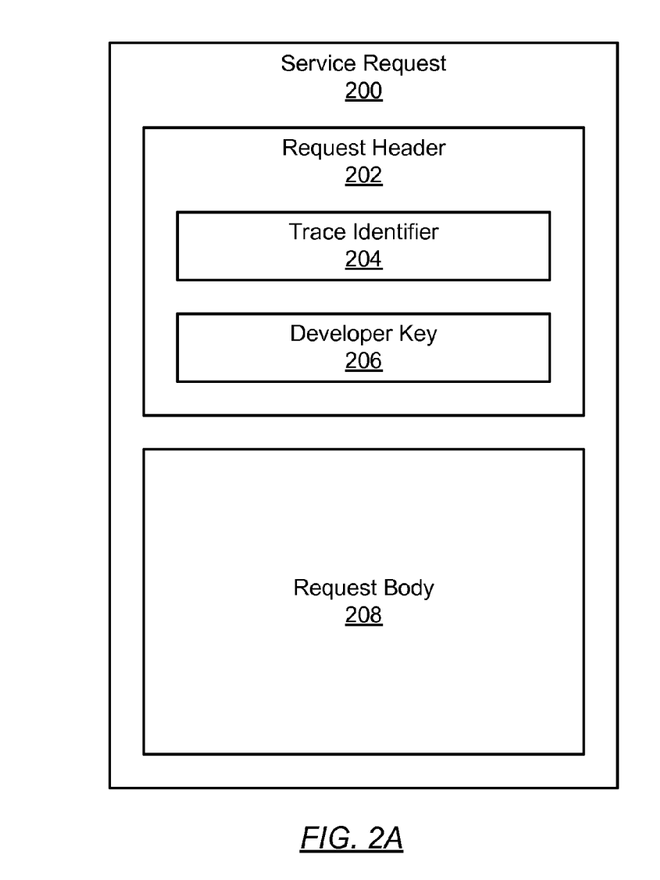
FIG. 2A shows a service request message in accordance with one or more embodiments of the invention.

FIG. 2A shows a service request (200) in accordance with one or more embodiments of the invention. The service request (200) may be sent from a client server located in a client system to a cluster server located in a cloud server cluster of the software services cloud. The service request (200) may include a request for a specific computation to be performed by the cloud service. A service request (200) may comply with the hypertext transfer protocol (HTTP) or hypertext transfer protocol secure (HTTPS). The service request may include a request header (202) and a request body (208).

In one or more embodiments of the invention, the request header (202) may include multiple fields which represent metadata used to establish the parameters of the communication between the client application which issued the service, and the cloud server which is handling the service request. The request body (208) may request portion of the service request, as well as potential input for computation being performed, parameters for searches, and similar data. In one or more embodiments of the invention, multiple messages may be exchanged between the client application and the software services cloud as part of the request. The request header (202) and request body (204) may not be included in every transmission between client application and the cloud service. In one or more embodiments of the invention, the same request header (202) may be used for all transmissions, but the request body (208) may not be sent until the connection has been established between the two.

In one or more embodiments of the invention, the service request (200) includes a request header (202). The request header (202) may include multiple fields which include operating parameters of the connection being set up between the client application and the cloud service server. If the service request is in accordance with the HTTP or HTTPS, the core set of fields standard for internet communication may be used. Alternatively, or additionally, a custom set of parameters may be used to facilitate the needs of the connection between the client application and the cloud service. In one or more embodiments of the invention, the request header (202) may be arbitrarily expandable. In other words, many additional fields of arbitrary length may be appended to the request header. In one or more embodiments of the invention, all communication from the client application to the cloud service involving the service request (200) uses all or a portion of the same request header (202). The request header (202) may remain constant and unmodified as the service request (200) data structure passes through multiple levels of virtual and physical abstraction en route from the client application to the software services cloud. In one or more embodiments of the invention, the request header includes a client trace ID (204) and a developer key (206) by the client application.

In one or more embodiments of the invention, the client trace ID (204) is a unique identifier that is unique for the client amongst all service requests from the client. The client trace ID (204) may be any string of sufficient length to ensure uniqueness. The string may be a completely random number. Alternatively, a value may be used that is incremented each time it is used as a client trace ID (204). In one or more embodiments of the invention, the client trace ID (204) may include a timestamp. The client trace ID (204) may include information which is significant or useful to the client. For example, a client trace ID (204) may include a user ID associated with a user of the client application when the client trace ID (204) was generated. Alternatively, or additionally, a client trace ID (204) may include a number indicating a particular application or server of the client system in which it was generated, or from which it was sent. In one or more embodiments of the invention, a client trace ID (204) may be alphabetic or alphanumeric. Further, the client trace ID (204) may be self-descriptive or easily recognizable to a user seeking to debug the client application or monitor the service request.

In one or more embodiments of the invention, the service request (200) may include a developer key (206). The developer key (206) may be appended to the request header (202) of the service request (200). In one or more embodiments of the invention, the developer key (206) is a string known to the cloud service, and associated with a specific client of the cloud service. The developer key (206) may be located in its own field in the request header (202). Alternatively, the developer key (206) may be concatenated with, or embedded within, the client trace ID (204).

In one or more embodiments of the invention, the service request (200) may include request body (208). The request body (208) may include the details of the request. The details of the request, parameters for the request, input for the request, limitations on the request, and other data which may be used to define the service or computation to be carried out by the software services cloud. The request body (208) may include, for example, a type of service that the service request is directed to. The type of service may be, for example: a software application to be executed; a desired result or inquiry about a particular data item; or a request to store, delete, or modify data within the cloud. In one or more embodiments of the invention, the request body (208) may include a particular destination cluster, module or destination application. The request body may also include data to be used in the service, and limitations to be place on the service. Data to be used in the service may include for example, input to an equation, function, or applications; terms for a search, data to be stored, changes to be applied; and/or other data. Limitations may include, for example, total expenditure of resources allowable to the client; total time to spend on the service; particular sources of data to utilize or ignore; limitations on the size, accuracy, precision, and format of a desired result or output; and/or other limitations.

Figure 2B:
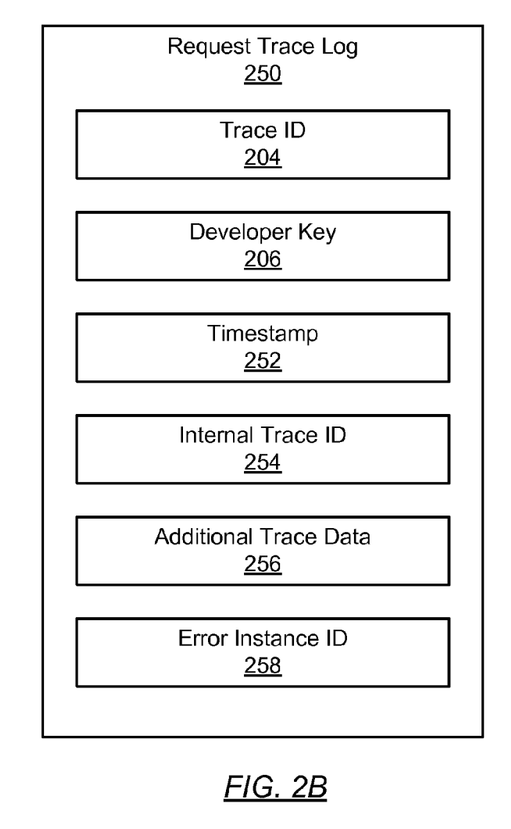
FIG. 2B shows a request trace log in accordance with one or more embodiments of the invention.

FIG. 2B shows a request trace log (250) in accordance with one or more embodiments of the invention. The request trace log (250) may be a file maintained by the monitoring application. As discussed above, the request trace log (250) may be a single file in which all information in the cloud service related to a specific service request (200) is gathered. Alternatively, many request trace logs (250) may exist, with each distinct request trace log (250) associated with a single component or group of components of the software services cloud service. If many request trace logs (250) are stored throughout the software services cloud, the information stored in each may vary. In one or more embodiments of the invention, both a single central request trace log (250) and many distributed request trace logs (250) may exist. The central request trace log (250) may store locations of the distributed request trace logs (250), and the distributed request trace logs (250) may store more detailed data on the interaction of the service request with the component which the local instance of the monitoring application is observing.

In one or more embodiments of the invention, the request trace log (250) includes the client trace ID (204) assigned to the service request (200) and the developer key (206) of the client application from which the service request (200) was received. The client trace ID (204) and developer key (206)

may be recorded when the request is received by a server of the software services cloud. If the request trace log (250) is distributed within the cloud, the client trace ID (204) and developer key (206) may be stored only in a central request trace log (250), or only in the request trace log (250) associated with the server or cluster which received the service request. Alternatively, the client trace ID (204) and developer key (206) may be passed along with the service request (200) as propagates through the systems of the software services cloud.

In one or more embodiments of the invention, the request trace log (250) includes a timestamp (252). The timestamp (252) may correspond to the service request being received by the software services cloud. Alternatively or additionally, if multiple trace request logs (250) exist, each of the trace request logs may maintain a timestamp relative to the local encounter with the service request (200).

In one or more embodiments of the invention, the request trace log (250) includes an internal trace ID (254). The internal trace ID (254) is an identifier of the service request that is unique amongst all service requests processed by the software services cloud in accordance with one or more embodiments of the invention. The internal trace ID (254) may be assigned by the cloud server cluster which received the service request, by the monitoring application which is maintaining the request trace log (250), or by another component of the software services cloud. The internal trace ID (254) may be completely unrelated to the client trace ID (204) generated by the client application. In one or more embodiments of the invention, the request trace log (250) may be indexed using the internal trace ID (254).

In one or more embodiments of the invention, the request trace log (250) includes additional trace data (256) associated with service request (200). The additional trace data (256) may include which components or systems of the cloud service were utilized to handle the request. For example, the request trace log (250) may include the path or paths taken by the service request from reception to completion. The additional trace data (256) may also include measurements of performance, such as latencies, power consumption, duration of use, volume of resources occupied, secondary applications accessed, network traffic generated and other metrics of system utilization. If the request trace log (250) is of the distributed variety, the additional trace data (256) may include the origin of the service request, the portion of the service request that was performed by the local cluster, and the destination of any sub-requests generated by the local cluster. Also, any additional components, systems or applications within the cloud service which were utilized to handle the request may also be recorded.

In one or more embodiments of the invention, if an error is detected while the service request is being processed or handled, an error instance ID (258) associated with the error may be stored in the request trace log (250). The error instance ID (258) In one or more embodiments of the invention, the monitoring application may generate an error instance ID (258) to be shown externally in response to detecting an internal error instance ID (258) generated by the component or system in which the error occurred. The error instance ID (258) may include information such as the location of the error, the time of the error, and a description of the error.

Figure 3:
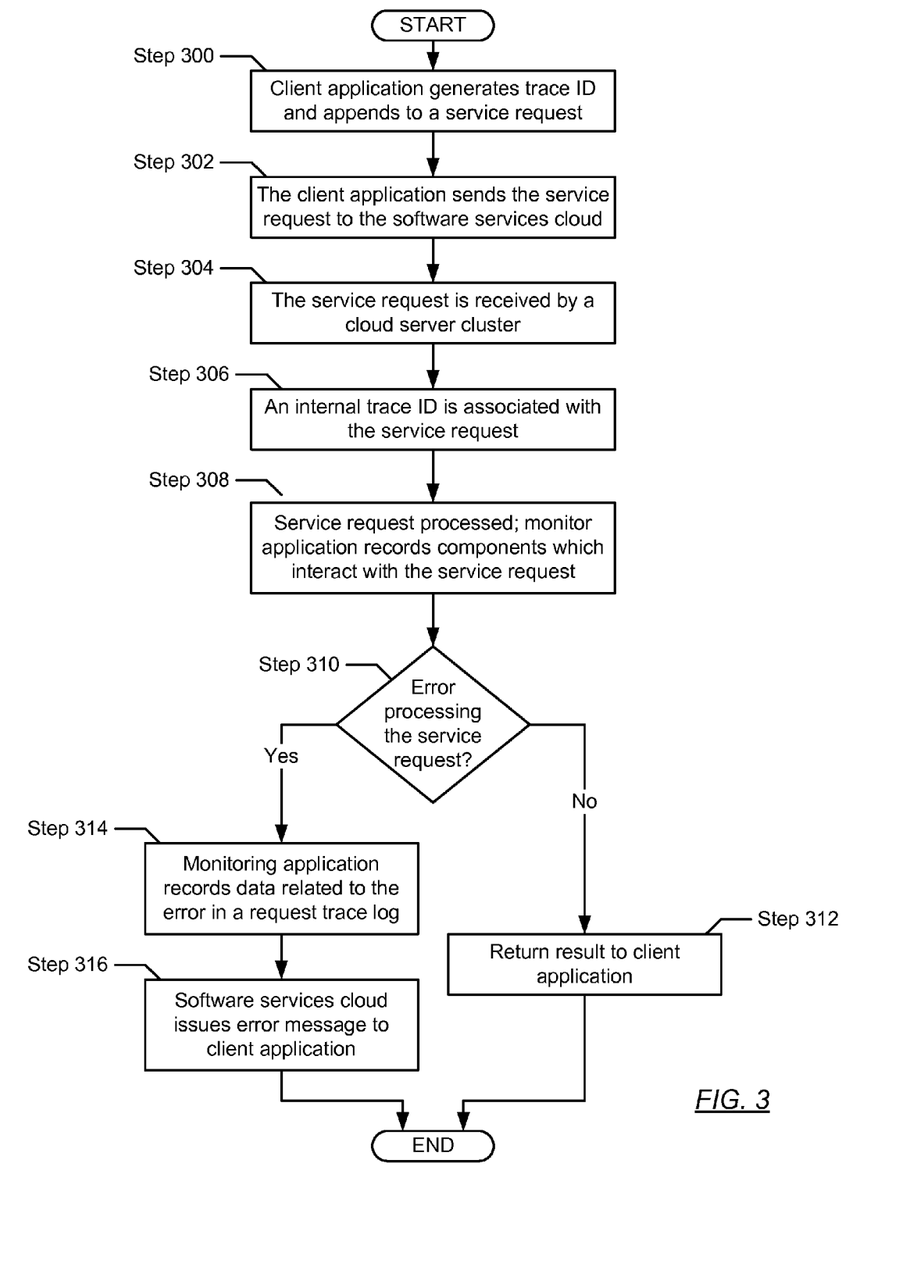
FIG. 3 shows a method for handling and tracing a service request in accordance with one or more embodiments of the invention.

FIG. 3 shows a flowchart for handling and tracing a service request in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 300, a client trace ID is generated by the client application and appended within the header of a service request in accordance with one or more embodiments of the invention. As discussed above, various techniques may be used to generate the client trace ID. In one or more embodiments of the invention, a user of the client application may select the client trace ID to be used, or may select a string to use as a basis for the client trace ID. Alternatively or additionally, the client application may select and a randomly generated number. Alternatively or additionally, a sequence number may be obtained and used. Details about the system on which the client application is executing may be obtained to aid in tracing the request. In one or more embodiments of the invention, the client application or client host system may modify selected client trace ID to attach a signature or identifying feature. For example, if a developer key is being sent as well, the client trace ID and the developer key may be concatenated and added as a single field. The selected client trace ID may also be padded or truncated to fit in a field of the header. In one or more embodiments of the invention, a record of the client trace ID is created and stored at the client host system, in case future use is required. The client trace ID may be displayed to the user while the request is issued.

The client trace ID is added to the header of the request prior to a connection being initiated with a software services cloud. In one or more embodiments of the invention, the service request may be an HTTP request. In this case, the client trace ID may simply be appended to the header as an additional field.

In one or more embodiments of the invention, the client trace ID may not be automatically included with a service request, but may instead require the user to execute the client application using a debugging tool or mode, or other method of testing the utilization of the software services cloud. In one or more embodiments of the invention, additional fields may need to be added to the header to convey to the receiving cloud server cluster of the software services cloud that a client trace ID is included in the header of the service request. Alternatively or additionally, the client trace ID may be added in a predefined location which the receiving server automatically checks.

In Step 302, the client application sends the service request to the software services cloud in accordance with one or more embodiments of the invention. The service request may include multiple fields. The fields may define parameters for a connection with one or more servers of a cloud server cluster. The service request may be sent from a single client server of the system on which the client application is executing. In one or more embodiments of the invention, multiple simultaneous connections may be established between multiple client host servers and cluster servers. The multiple connections may be used to handle a single request in parallel, or to handle multiple requests simultaneously. In one or more embodiments of the invention, the service request may be sent to a specific cloud server cluster or server within the cluster. Alternatively or additionally, the service request may be directed at a particular address or service associated with the software services cloud, and the service request may be redirected to a cloud server which will handle the service request.

In Step 304, the service request is received by the cloud service, and a connection is established between a cloud server and the client application in accordance with one or more embodiments of the invention. The details of the service request may be included in the request body of the service request. The cloud server may analyze the contents of the service request and determine what is being requested. The cloud server may then handle the request or pass the service request off to other portions of the software services cloud.

In Step 306, an internal trace ID is associated with the service request in accordance with one or more embodiments of the invention. In one or more embodiments of the invention, the internal trace ID may be automatically generated by the cloud server which is connected with the client application. Alternatively or additionally, the internal trace ID may be generated by the monitoring application. Internal trace IDs may be sequential numbers assigned to service requests as the software services cloud receives the service requests. In one or more embodiments of the invention, the sequence may be specific to the cloud server or software services cloud in which the internal trace ID was generated. The internal trace ID may be generated in the software services cloud similar to as discussed above with respect to generating the client trace ID.

In Step 308, the service request is processed by the cloud server cluster in accordance with one or more embodiments of the invention. After the cloud server has analyzed the contents of the service request, the cloud server may handle the request locally, forward the service request to another system with appropriate functionality, or issue instructions to other systems of the software services cloud to perform all or portions of the task requested. If the task is handled locally, the task may be executed by the cloud server itself, or by dedicated hardware directly accessible to the cloud server.

In one or more embodiments of the invention, the cloud service may be made up of many different systems. Different systems within the software services cloud may be dedicated to performing different tasks. In one or more embodiments of the invention, the service request may be passed to sequentially to multiple computing clusters in increasing order of specialization. Alternatively, or additionally, different services required to complete the service request may be sent to different clusters to be executed in parallel. In one or more embodiments of the invention, the client application may obtain functionality to leverage the connection to the software services cloud to directly control a portion of the computing resources of the cloud. In one or more embodiments of the invention, the computing clusters of the software services cloud may be include functionality to manipulate or perform computations on a data stream provided by the client application through the connection. The receiving cloud server may forward the data to be manipulated to the computing cluster or clusters performing the computation.

Additionally, in Step 308, the monitor application records the interaction of the service request and the cloud service in a request trace log in accordance with one or more embodiments of the invention. The monitoring application may include functionality to monitor the various server clusters, computing clusters, data repositories, and other components located within the software services cloud. The local instances of the monitoring application may record every interaction with every request, or portion of a request and store a record describing the interaction in the request trace log corresponding to the service request. In one or more embodiments of the invention, a separate instance of the request trace log for the service request is maintained for each instance of the monitoring application. The instances of the request trace log may include different sets of data, which is specific to the component of the software services cloud which is being monitored. In one or more embodiments of the invention, data collected by the distributed monitoring applications may be written to a central request trace log. In one or more embodiments of the invention, in embodiments in which only a single instance of the monitoring application for the entire software service cloud exists, components may include functionality to report significant events to the monitoring application to be recorded.

In Step 310, a determination is made if an error has occurred in the processing of the service request by the software service cloud. An error may be a cluster or other component of the software service cloud failing to perform as expected, a failure in communication, either within the software services cloud, or with an external system, a lack of data required to fulfill the request, and any other potential type of misuse or bug within the cloud service. The error may be in software, hardware, or a combination. In one or more embodiments of the invention, the component or system in which the error occurs detects the error and signals an error condition. The error condition may include a code or instance number which corresponds to the nature of the error. In one or more embodiments of the invention, the error may be discovered by the monitoring application, either by observing the error during monitoring, or by detecting a discrepancy in data recording in the request trace log.

In Step 312, if no error occurs in processing the service request, the service request is handled and the result is optionally returned to the client application. Further, the connection which facilitated the service request being sent may be terminated. Although FIG. 3 shows the returning of the result to be mutually exclusive with the error, in one or more embodiments of the invention, if the error can be overcome automatically, the handling of the service request continues, and the result is returned regardless.

In Step 314, if an error occurs while processing the service request, data related to the error is recorded in the request trace log. The data may include the error instance number discussed above. Other details relevant to the error, such as the state of the system at the point where the error occurred, the task that was being performed, the time at which the error occurred, and similar data.

In Step 316, if an error occurs, the software services cloud sends an error message to the client application. The error message may simply inform the client application that the handling of the request could not be completed due to an error. Alternatively, the error message may include the client trace ID appended to the header of the service request by the client application, the error instance number, and other information that may be used to trace the service request and the error within the software services cloud. For example, if the software services cloud experienced an error while processing a client service request, the client would receive an error message. If the client contacted an administrator or automated error application at the software services cloud to resolve the error, the client could supply the client trace ID. The administrator or an automated application could use the client trace ID to perform a search of request trace logs at cloud server clusters that the client may have sent the service request to. When the request trace log associated with the client trace ID was identified, the administrator could extract the internal trace ID, and easily track down the error within the software services cloud.

Figure 4:
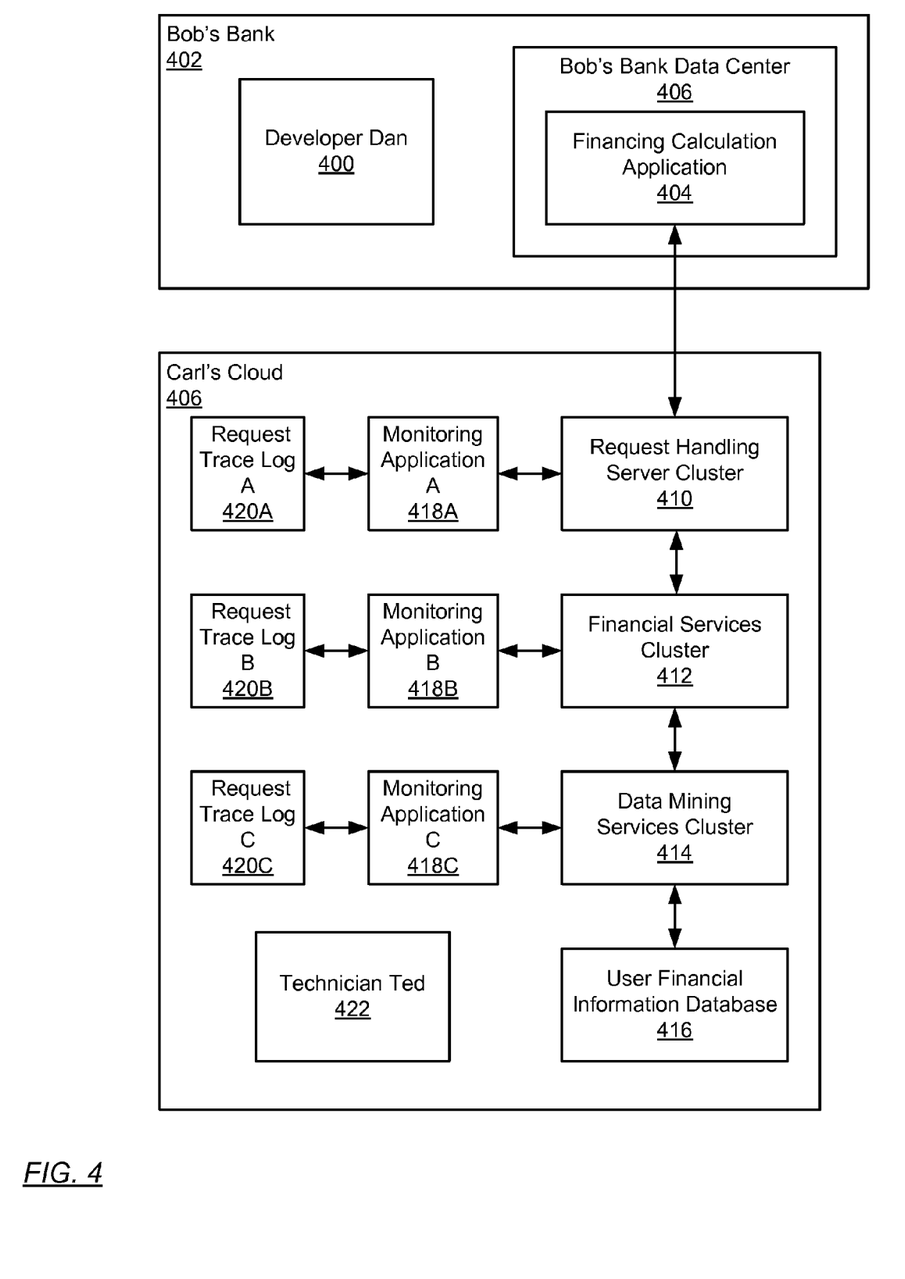
FIG. 4 shows an example of a cloud service provider handling and tracing a service request in accordance with one or more embodiments of the invention.

FIG. 4 shows an example in accordance with one or more embodiments of the invention. The example is included for explanatory purposes only and is not intended to limit the scope of the invention.

Developer Dan (400) is a financial software service programmer at Bob's Bank (402). Dan (400) is currently perfecting his most recent project for Bob's Bank (402), a financing calculation application (404), which will run locally on Bob's Bank Data Center (406) and will allow bankers at Bob's Bank (402) to easily obtain the terms for financing terms to give to potential customers. Since Bob's Bank (406) lacks the computational capacity and access to appropriate information on potential customers, Dan (400) has decided to use a Carl's Cloud (408), a financial services and data aggregation company, to calculate loan financing remotely.

Dan (400) is currently debugging the financing calculation application (404). In order to request that Carl's Cloud (408) obtain financing for a particular customer, Dan (400) generates an HTTPS request using Loan Financing Calculator (404). The HTTPS request includes in the request body an identifier of the task that the loan financing calculator (404) is asking Carl's Cloud (406) to perform, in this case a financing appraisal, and an identifier of the customer for who the financing appraisal is being done. Included in the header of the request, in addition to the parameters of the connection being established, are a developer key identifying Bob's Bank (402) as the entity making the request, and a client trace ID generated by Dan (400), which will allow his counterpart at Carl's (406), Technician Ted, to easily identify a particular service request that was received.

From Dan's (400) perspective, after the HTTPS request is generated by the financing calculation application (404), the HTTPS request is sent by one of the servers in Bob's Bank Data Center to Carl's Cloud (408). Because Dan (400) is working in a virtual environment provide by the data center (406), Dan (400) does not know exactly which of the servers sends the request, nor does Dan (400) know the exact destination within Carl's Cloud (408). The message is received by an available server in a request handling server cluster (410) located in a general purpose data center in Carl's Cloud (408). As soon as the request is in Carl's Cloud (408), an internal trace ID is assigned to it. In this case, the internal trace ID is simply a value that is incremented for each request received by Carl's Cloud (408). When the request is received, a first instance of a monitoring application (418A) located on the request handling server (410) records the developer key, client trace ID, and timestamp corresponding to the reception of the request into a request trace log (420A) associated with the internal trace ID.

The request handling server (410) processes the contents of the request from Bob's Bank (400), and identifies it as financial in nature. After reformatting the request for internal transmission with Carl's Cloud (406), the request handling server cluster (410) forwards the request to a second data cluster dedicated to financial services (416). The monitoring application (418A) records the time at which the request was forwarded, and the destination in request trace log (420A)

The request is received by the financial services cluster (412). A second instance of the monitoring application (418B), observes and records the receipt of a request with the internal trace ID, and appends additional data about the local handling of the request, including where the request was received from, which physical machines are involved handling the request, and other relevant data to the request trace log (420B). The financial services cluster (412) includes functionality to perform most of the computation to acquire the financing projection; however, to do so, the data must be obtained, which describes the financial history of the subject calculation. A sub-request to obtain said financial historical data is generated, and associated with the internal trace ID. The sub-request is then sent to a third data cluster, which is dedicated to performing data mining cluster (414).

Upon receipt of the sub-request, like the other clusters, an instance of the monitoring application (418C) executing on the data mining cluster records the details of the request relevant to the data mining cluster (414) to the local request trace log (420C). The data mining cluster (414) identifies a likely location of data appropriate for performing the computation. In this case, the likely location is identified that the subject of the calculation has an account with a personal finance application offered by a subsidiary of the parent company of Carl's Cloud (408), which has a user financial information database (416) located within the cloud. The data mining services cluster (414) sends a data request to the data cluster in which the user financial information database (416) is located. However, the server within the data mining cluster (414), which is connected to the user financial information database (416), fails to establish a connection. When a connection cannot be established, the data mining services cluster (414) issues an error notification, including an error instance ID. The local instance of the monitoring application (418C) records the error instance ID to the request trace log (420C), as well as the server which was involved, and the intended destination of the data request.

Meanwhile, the error in handling the request has propagated back through the chain of data clusters, with each cluster returning a more generic message to the next. Along the way, each of the monitoring applications (e.g., monitoring application A (418A), monitoring application B (418B), monitoring application C (418C)) records the details of the received error message to the local trace log (record trace log A (420A), record trace log B (420B), record trace log C (420C)) which is associated with the internal trace ID. Eventually, the request handling server (410) to which the Bob's Bank Data Center (406) is connected simply terminates the connection using a fail condition, and a confused Dan (400) is left to try and debug his own software. After failing to identify an error in his system, Dan (400) calls Technician Ted (422) at the IT department of Carl's Cloud (408). Dan (400) informs Ted (422) of the problem, and provides him with his developer key, and several client trace IDs for his various failed service requests.

Ted (422) performs a search of request trace log A (420A) of the request handling server cluster (410) for a request trace log (420A) which matches the developer key and client trace ID associated with the request. After determining that the error was not in the request handling server cluster, Ted (422) traces the request to the financial service cluster (412). After consulting the local request trace log B (420B), he determines that the error did not originate in the financial service cluster (412) either, and traces the sub-request to the data mining cluster (414). Technician Ted (422), after consulting the request trace log C (420C), correctly identifies the problem server in the data mining cluster (414), and remotely initiates a reset which fixes the problem.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium.

Specifically, the software instructions may correspond to computer readable program code that when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a service request, comprising:
    receiving, from a client application, the service request comprising a header comprising transmission metadata and a client trace ID, wherein the client application is executing on virtual resources provided by a client host system, including a virtual network interface;
    appending, to the service request, an internal trace ID;
    generating a request trace log comprising the client trace ID, the internal trace ID, and a time stamp corresponding to receiving the service request;
    selecting a cloud server configured to process the service request;
    determining, by the cloud server, a dedicated computing cluster of a plurality of distributed cloud computing clusters to handle the service request;
    sending, by the cloud server, the service request to the dedicated computing cluster; and
    recording, in the request trace log, an interaction of the dedicated computing cluster with the service request, and an identity of a server in the client host system from which the service request was issued.

2. The method of claim 1 further comprising:
    detecting an error in the interaction of the dedicated computing cluster with the service request;
    generating an error instance ID corresponding to the error;
    recording the error instance ID in the request trace log; and
    issuing an error message to the client application, comprising the error instance ID and the client trace ID.

3. The method of claim 1, further comprising:
    identifying a category of software for handling the service request; and
    identifying, based on the category of software, the dedicated computing cluster, wherein the dedicated computing cluster is configured to execute a software application in the category of software.

4. The method of claim 3, wherein the plurality of distributed cloud computing clusters maintain a plurality of request trace files associated with the internal trace ID for the service request, wherein each of the plurality of request trace files comprise data describing processing of the service request in a corresponding distributed computing cluster.

5. The method of claim 1, wherein the service request is an HTTP request, and wherein the header is an HTTP header.

6. A system for processing a service request, comprising:
    a processor;
    a cloud server cluster configured to:
        receive, from a client application, the service request comprising a header comprising transmission metadata and a client trace ID, wherein the client application is executing on virtual resources provided by a client host system, including a virtual network interface;
        select a cloud server of the cloud server cluster to process the service request;
        determine, by the cloud server, a dedicated computing cluster of a plurality of distributed cloud computing clusters to handle the service request; and
        send, by the cloud server, the service request to the dedicated computing cluster; and
    a monitoring application, configured to:
        append, to the service request, an internal trace ID;
        generate a request trace log comprising the client trace ID, the internal trace ID, and a time stamp corresponding to receiving the service request; and
        record, in the request trace log, components of distributed computing resources which interact with the service request, and an identity of a server in the client host system from which the service request was issued.

7. The system of claim 6, wherein the monitoring application is further configured to:
    detect an error in the interaction of the dedicated computing cluster with the service request;
    generate an error instance ID corresponding to the error;
    record the error instance ID in the request trace log; and
    issue an error message to the client application, comprising the error instance ID and the client trace ID.

8. The system of claim 6, wherein the cloud server cluster is further configured to:
    identify a category of software for handling the service request; and
    identify, based on the category of software, the dedicated computing cluster, wherein the dedicated computing cluster is configured to execute a software application in the category of software.

9. The system of claim 8, wherein the plurality of distributed cloud computing clusters maintain a plurality of request trace files associated with the internal trace ID for the service request, wherein each of the plurality of request trace files comprise data describing processing of the service request in a corresponding distributed computing cluster.

10. The system of claim 6, wherein the service request is an HTTP request, and wherein the header is an HTTP header.

11. A non-transitory computer readable medium comprising computer executable instructions for:
    receiving, from a client application, a service request comprising a header comprising transmission metadata and a client trace ID, wherein the client application is executing on virtual resources provided by a client host system, including a virtual network interface;
    appending, to the service request, an internal trace ID;
    generating a request trace log comprising the client trace ID, the internal trace ID, and a time stamp corresponding to receiving the service request; selecting a cloud server configured to process the service request;
    determining, by the cloud server, a dedicated computing cluster of a plurality of distributed cloud computing clusters to handle the service request;
    sending, by the cloud server, the service request to the dedicated computing cluster; and
    recording, in the request trace log, an interaction of the dedicated computing cluster with the service request, and an identity of a server in the client host system from which the service request was issued.

12. The non-transitory computer readable medium of claim 11, further comprising computer executable instructions for:
    detecting an error in the interaction of the dedicated computing cluster with the service request;
    generating an error instance ID corresponding to the error;
    recording the error instance ID in the request trace log; and issuing an error message to the client application, comprising the error instance ID and the client trace ID.

13. The non-transitory computer readable medium of claim 11, further comprising computer executable instructions for:
identifying a category of software for handling the service request; and
identifying, based on the category of software, the dedicated computing cluster, wherein the dedicated computing cluster is configured to execute a software application in the category of software.

14. The non-transitory computer readable medium of claim 13, wherein the plurality of distributed cloud computing clusters maintain a plurality of request trace files associated with the internal trace ID for the service request, wherein each of the plurality of request trace files comprise data describing processing of the service request in a corresponding distributed computing cluster.

15. The non-transitory computer readable medium of claim 11, wherein the service request is an HTTP request, and wherein the header is an HTTP header.

* * * * *